May 15, 1962 G. W. S. GRIFFITH 3,035,169

RADIO RELAY SYSTEM WITH AUTOMATIC CHANNEL SELECTION BASED UPON SIGNAL STRENGTH

Filed Oct. 1, 1957 3 Sheets-Sheet 1

INVENTOR

George William Sapsworth Griffith

BY Kurschlein, Fraschlein & Oettinger

ATTORNEYS

May 15, 1962 G. W. S. GRIFFITH 3,035,169

RADIO RELAY SYSTEM WITH AUTOMATIC CHANNEL SELECTION BASED UPON SIGNAL STRENGTH

Filed Oct. 1, 1957 3 Sheets-Sheet 2

INVENTOR

George William Sapsworth Griffith

BY Kirschstein, Kirschstein & Ottinger

ATTORNEYS

INVENTOR
GEORGE WILLIAM SAPSWORTH GRIFFITH
BY Kirschstein, Kirschstein & Ottinger
ATTORNEYS 3,035,169
Patented May 15, 1962

3,035,169

RADIO RELAY SYSTEM WITH AUTOMATIC CHANNEL SELECTION BASED UPON SIGNAL STRENGTH

George William Sapsworth Griffith, Leamington Spa, England, assignor to The General Electric Company Limited, Kingsway, London, England, a British company Filed Oct. 1, 1957, Ser. No. 687,414
Claims priority, application Great Britain Oct. 3, 1956
7 Claims. (Cl. 250—15)

This invention relates to radio communication systems of the kind comprising two terminal stations and one or more repeater stations for passing intelligence that is to be transmitted between the terminal stations in at least one direction of transmission. The invention is more particularly concerned with apparatus for use in such repeater stations.

One object of the present invention is to provide improved apparatus for a radio repeater station.

For the purpose of reducing the periods of interruption of service due to faults in the equipment, it has been proposed in a radio communication system to provide two separate communication channels between the terminal stations using different radio frequencies for the two channels, both channels passing the same intelligence, and at the receiving terminal selecting the received signal which is qualitatively the better. It has, however, now been realised that if such a two-channel arrangement includes one or more repeater stations, the equipment at the stations of the system is not used to the best advantage since if a single fault develops in one of the two channels, communuication is effected over the remaining channel and no use is made of those equipments of the "faulty" channel which are themselves operating correctly.

Another object of the present invention is to provide apparatus for a radio repeater station which overcomes the disadvantage referred to in the last paragraph.

According to the present invention, radio repeater station apparatus comprises a first radio receiver, a radio transmitter, a path connecting the first radio receiver and the radio transmitter, during normal operation of the apparatus for the purpose of feeding the receiver output signal to the transmitter as a modulation signal for the transmitter, a second radio receiver, a utilization device associated with the second radio receiver, a T-network which has resistive series and shunt arms and which is connected in a path between the second receiver and the said utilization device, switching means arranged to provide a path through the said shunt arm of the network to the said transmitter upon the quality of the signal supplied by the first receiver falling below a predetermined standard whereby, when the quality of the signal supplied by the first receiver falls below the said predetermined standard, the modulation signal for the transmitter is arranged to be supplied by the second receiver instead of by the first radio receiver while the said utilization device is still supplied by the second receiver.

The said utilization device may be another radio transmitter which is arranged so that the signal supplied thereto through the said network is utilized as a modulation signal.

According to a feature of the present invention, radio repeater station apparatus comprises first and second radio receivers, first and second radio transmitters, first and second attenuation networks which, during normal operation, are connected respectively between the first and second receivers on the one hand and the first and second transmitters on the other hand thereby providing two separate channels through the station, the arrangement being such that, during normal operation of the apparatus, signals carrying the same intelligence are passed over the two channels in the same direction through the station, and switching means which is responsive to the signals supplied by the two receivers and which operates when the quality of either one of those signals is below a predetermined standard to interrupt the path supplying the poor quality signal to the appropriate transmitter and to feed the signal from the other receiver to both transmitters, the attenuation between the one receiver and each of the two transmitters when the said means is operated being the same as that between the receivers and transmitters under normal conditions.

According to another feature of the present invention, radio repeater station apparatus comprises first and second radio receivers each of which has first and second outputs, first and second radio transmitters, two paths which include first and second attenuation networks respectively and which, during normal operation, are connected respectively between the first outputs of the first and second receivers on the one hand and the first and second transmitters on the other hand thereby providing two separate channels through the station, the arrangement being such that, during normal operation of the apparatus, signals carrying the same intelligence are passed over the two channels in the same direction through the station, first and second utilization devices, third and fourth attenuation networks which are connected respectively between the second outputs of the first and second receivers on the one hand and the first and second utilization devices on the other hand, and switching means which is responsive to the signals supplied by the two receivers and which operates when the quality of either one of those signals is below a predetermined standard to interrupt the path supplying the poor quality signal from the first output of one of the receivers to the appropriate transmitter and to feed a signal to that transmitter from the second output of the other receiver by way of the appropriate third or fourth attenuation network, the levels of the signals supplied by way of either the third or fourth attenuation network to the appropriate transmitter and to the said utilization device connected to that network when the said means is operated being substantially the same as under normal conditions.

Three examples of repeater station apparatus which are in accordance with the present invention and which are for use in a radio communication system will now be described with reference to the six figures of the accompanying drawings in which FIGURE 1 shows diagrammatically the complete system;

Figure 1:
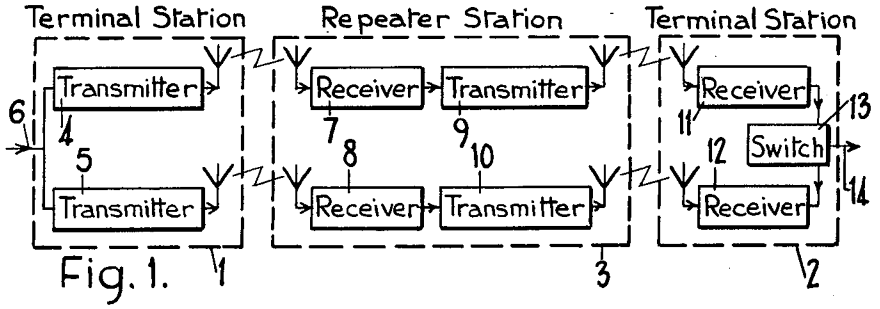

Referring to FIGURE 1, the radio communication system comprises two terminal stations 1 and 2 and a repeater station 3 and although only one repeater station 3 is shown in the drawing, it is to be understood that there may be a plurality of like stations provided between the two terminal stations 1 and 2. The terminal station 1 has two radio transmitters 4 and 5 which are arranged to operate at different radio frequencies but which are supplied with the same modulation signal over a common path 6. The apparatus of the repeater station 3 comprises two radio receivers 7 and 8 which are tuned to the frequencies of the transmitters 4 and 5 respectively and two radio transmitters 9 and 10. During normal operation, the output signals of the receivers 7 and 8 are fed as modulation signals to the transmitters 9 and 10 respectively and in the examples to be described, these signals are provided by sub-carriers modulated by the intelligence to be transmitted over the system. For example, if the radio frequencies are in the region of 2000 megacycles per second, the signals supplied by the receivers 7 and 8 may be intermediate frequency signals in the region of 70 megacycles per second. The terminal station 2 has radio receivers 11 and 12 which are tuned to the different frequencies of the transmitters 9 and 10 respectively.

It will be appreciated that there are effectively two separate channels between the terminal stations 1 and 2 and at the station 2 the output signal of the receiver 11 or 12 that is qualitatively better than the other signal is selected by means of a switch 13 and passed to an output path 14.

Figure 2:
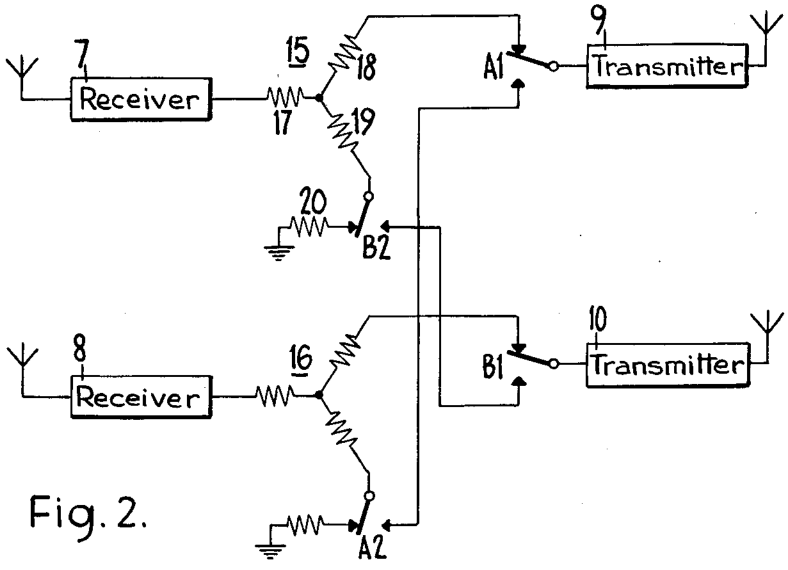
FIGURE 2 shows the circuit of the first example of repeater station apparatus.

Referring now to FIGURE 2 of the accompanying drawings, the first example of repeater station apparatus to be described has resistive T-networks 15 and 16 connected respectively between the receivers 7 and 8 on the one hand and the transmitters 9 and 10 on the other hand. Each of these networks 15 and 16 introduces an attenuation of 6 decibels.

The output impedance of each of the receivers 7 and 8 is 75 ohms while the input impedance of each of the transmitters 9 and 10 is also 75 ohms. In order to give the desired attenuation, the resistors 17 to 20, which make up the network 15, for example, are chosen so that the resistors 17 and 18 in the series arm of the network each has a value of 25 ohms while the resistors 19 and 20 in the shunt arm have values of 25 and 75 ohms respectively.

As will be apparent hereinafter, each of the receivers 7 and 8 is provided with means to assess qualitatively the signals passed by those two receivers. Provided this assessment does not reveal that there is a fault in one of the channels, the signals supplied by the receivers 7 and 8 are passed to the transmitters 9 and 10 as shown in FIGURE 2. If, however, the assessment shows that the channel containing one of the receivers 7 and 8, say the receiver 8, is faulty (the fault obviously occurring before that receiver output) then an electromagnetic relay B is operated. The change-over contacts B1 of this relay disconnect the transmitter 10 from the attenuation network 16 while the change-over contact B2 breaks the connection between the resistors 19 and 20. These change-over contacts effectively connect the resistor 19 to the input of the transmitter 10 but it will be realised that since the input impedance of this transmitter is the same as the impedance of the resistor 20, the attenuation network 15 is unchanged as far as the signal supplied from the receiver 7 to the transmitter 9 is concerned. Moreover, it will be seen from symmetry of the circuit that the same level of signal is fed to both the transmitters 9 and 10.

Similarly an electromagnetic relay A is arranged to be operated when the output from the receiver 7 is of poor quality so that the transmitter 9 is then fed with a modulation signal from the receiver 8 by way of contacts A1 and A2.

Figure 3:
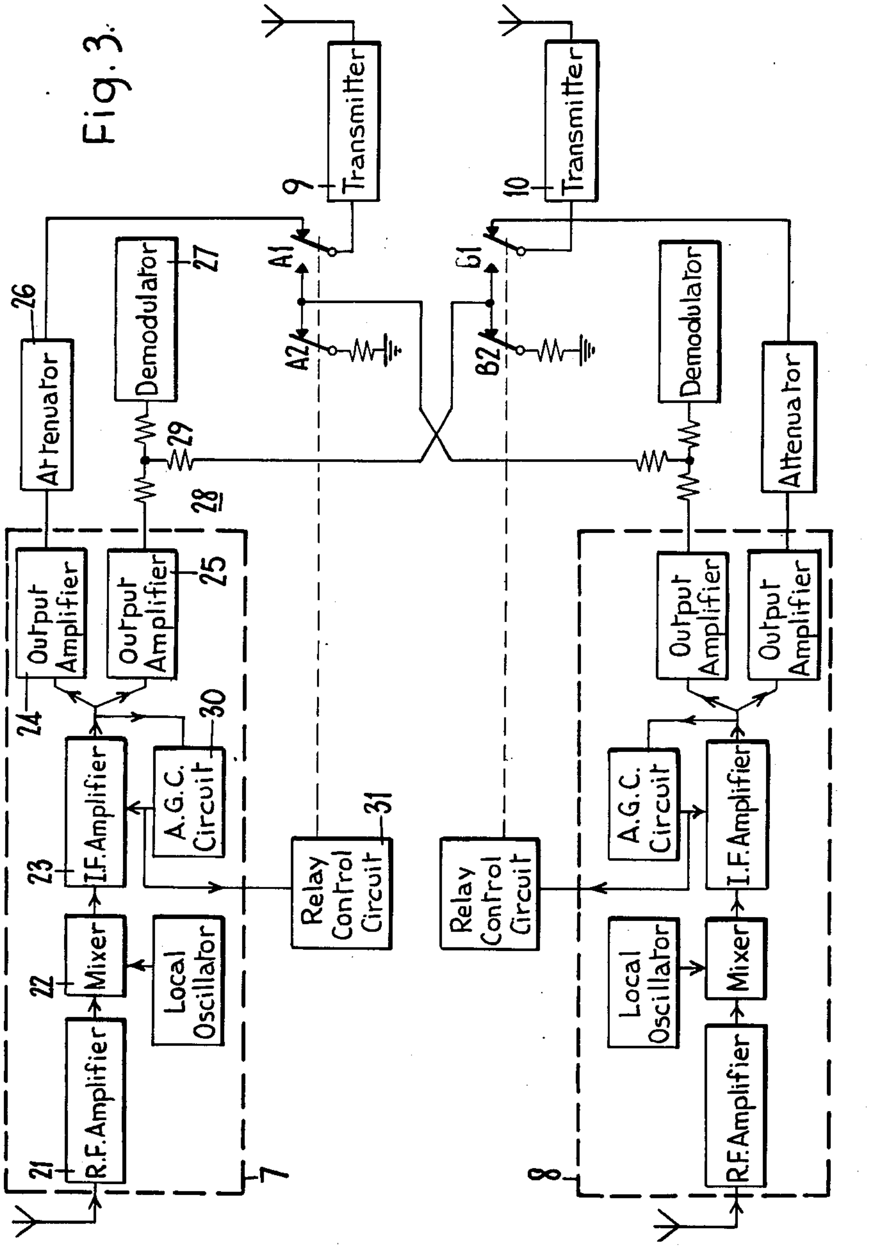
FIGURE 3 shows the second example of repeater station apparatus.

The second example now to be described with reference to FIGURE 3 is a development of the first example but in this case each of the receivers 7 and 8 has two outputs. Considering for example the receiver 7 in more detail, it comprises a radio frequency amplifier 21 followed by a mixer 22 and an intermediate frequency amplifier 23. The signal passed by the amplifier 23 is fed to two like output amplifiers 24 and 25.

The signal supplied by the amplifier 24 is passed through an attenuator 26, which introduces an attenuation of 6 decibels, and relay contacts A1 to the transmitter 9. The signal supplied by the amplifier 25 is passed to a demodulator 27 by way of an attenuation network 28 which is identical to the network 15 previously described with reference to FIGURE 2. The demodulator 27 forms part of the equipment for an engineer's channel to the repeater station but since this channel is no concern of the present invention, the equipment providing it will not be further described in the present specification.

In this case upon the output signal of the receiver 8, say, being of poor quality, the relay B is operated so that the transmitter 10 is disconnected from the receiver 8 and is arranged to be supplied from the receiver 7 by way of the resistor 29 forming part of the network 28.

A portion of the intermediate frequency signal supplied by the amplifier 23 of the receiver 7, for example, is fed to a circuit 30 which is arranged to derive a voltage which is utilized to effect automatic gain control of the amplifier 23. This voltage is also passed to a relay control circuit 31 which is arranged to operate the relay contacts A1 and A2. Thus if the automatic gain control voltage becomes more positive due to a fall in the level in the intermediate frequency signal beyond a predetermined value, the contacts A1 and A2 are caused to be operated to effect a change-over in the manner previously described.

Figure 4:
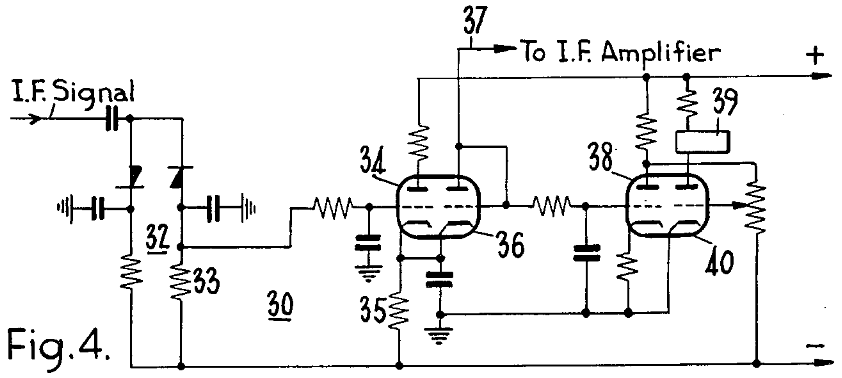
FIGURE 4 shows the circuit of part of the apparatus of FIGURE 3 in more detail.

Referring now to FIGURE 4, the automatic gain control circuit 30 is formed by a rectifier circuit 32 which is arranged to develop a unidirectional voltage across a resistor 33 in dependence upon the level of the intermediate frequency signal. This voltage is passed to the control grid of a triode valve 34 and the voltage developed across the cathode resistor 35 is passed through a triode valve 36 which is connected as a diode valve to the path 37, the voltage of this path 37 being utilized to control the gain of the amplifier 23.

The voltage on the path 37 is also supplied to the control grid of a triode valve 38 which is arranged as a direct current amplifier. The operating winding 39 of the relay A is connected in the anode circuit of another triode valve 40 to the control grid of which is supplied a voltage dependent upon that passed by the valve 38. The arrangement is such that during normal operation the level of the intermediate frequency signal is such that the relay A is operated so that the positions of the contacts A1 and A2 of this relay in FIGURE 3 are, in fact, the operated positions. When, however, the level of the intermediate frequency signal falls below the predetermined value, the relay A is released and the required change-over effected.

It will, of course, be understood that the circuits for operating the relay contacts A1, A2 and B1, B2 in the first example described above with reference to FIGURE 2 may be the same as those described above with reference to FIGURES 3 and 4.

It is convenient not to provide relay contacts in the paths between the receivers 7 and 8 and the transmitters 9 and 10 during normal operation as is the case in the example of FIGURE 2. Such contacts may be changed by making use of the third example now to be described with reference to FIGURE 5. In this case the networks 15 and 16 are again provided respectively between the receivers 7 and 8 on the one hand and the transmitters 9 and 10 on the other hand.

A relay control circuit 31 is associated with the receiver 7, in the manner described in connection with the second example, but only a single change-over contact A1 is provided. This contact A1 operates when the level of the intermediate frequency signal supplied by the receiver 7 is below the predetermined value to feed the transmitter 9 from the receiver 8 by way of the network 16 and amplifier 41 and the network 15. It will be realised that the networks 15 and 16 each introduce an attenuation of 6 decibels and accordingly the amplifier 41 is required to boost the level of the modulation signal fed to the transmitter 9, this amplifier 41 having a gain of 6 decibels.

In this example it is desirable in some way to interrupt the output signal of the receiver 7 which may have a large noise component and this may conveniently be done by utilising further contacts of the relay A to switch off an output stage of the receiver 7.

Figure 5:
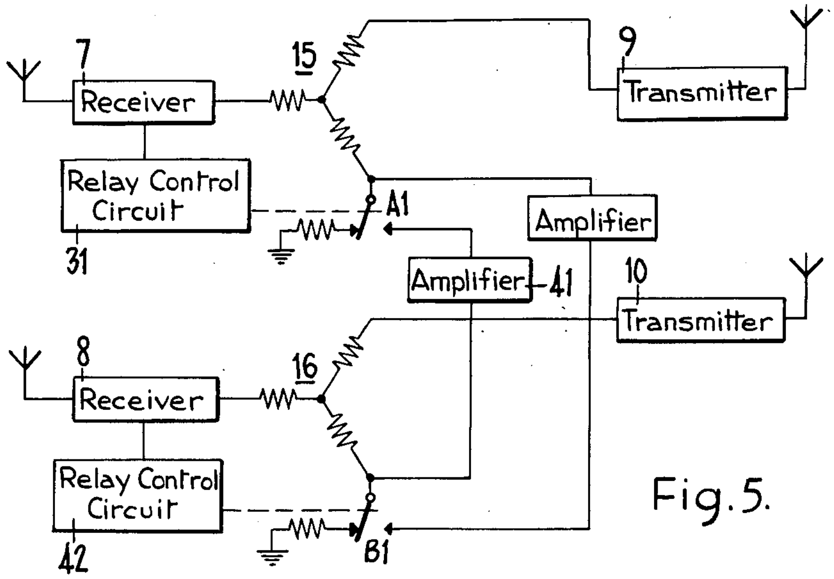
FIGURE 5 shows the third example of repeater station apparatus.
Figure 6:
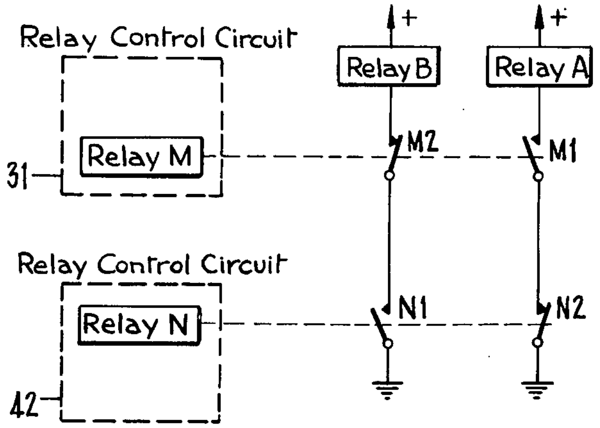
FIGURE 6 shows an alternative form of part of the apparatus of all three examples.

An interlock may be provided to prevent either of the relays A and B in the examples described above being operated when the levels of the signals supplied by both the receivers 7 and 8 are low. Thus referring now to FIGURE 6 of the accompanying drawings, if the operating winding of the relays A and B in the relay control circuits 31 and 42 are replaced by the operating windings of relays M and N, the contacts of the relays M and N may be connected in circuit with the operating windings of the relays A and B in the manner shown. If for example the level of the signal supplied by the receiver 7 is low, the relay M releases thereby closing the contacts M1 and completing the operating circuit of the relay A. It will be appreciated that with this modification the positions of the contacts of the relays A and B shown in FIGURES 2, 3 and 5 are the positions taken up when the relays A and B are released.

It will be understood that the relay control circuits such as the circuit 31 need not respond to the level of the received signal. Alternatively they may respond to the noise levels of the two received signals, the necessary noise level measurements preferably being made in a selected frequency band the lower frequency of which is slightly greater than the upper frequency of the band occupied by the intelligence being transmitted over the system.

Although in the examples described above the signals supplied by the receivers 7 and 8 at the repeater station are intermediate frequency signals, it will be realised that this is not necessary and the receivers may derive the modulated signals for the transmitters 9 and 10 by completely demodulating the received radio signals.

I claim:

1. A radio communication system comprising: a transmitting terminal station which has two radio transmitters and means to supply the same modulation simultaneously to both transmitters; a receiving terminal station which has two radio receivers which are linked by way of two signalling channels to the said two transmitters, an output path, and means to select and pass to the output path the qualitatively better one of the signals supplied by the two receivers; and a relay station which comprises a first radio relay receiver, a second radio relay receiver, a first radio relay transmitter, a second radio relay transmitter, a first attenuation network normally connected between the first radio relay receiver and the first radio relay transmitter to feed an output signal supplied by the first radio relay receiver as a modulation signal to the first radio relay transmitter, a second attenuation network normally connected between the second radio receiver and the second radio relay transmitter to feed an output signal supplied by the second radio relay receiver as a modulation signal to the second radio relay transmitter, the first radio relay receiver and the first radio relay transmitter forming part of one of said signalling channels, the second radio relay receiver and the second radio relay transmitter forming part of the other signalling channel, and each of the first and second networks being a T-network which has resistive series and shunt arms, control means which is connected to both the first and second radio relay receivers and which is responsive to the signals supplied by those receivers, and switching means which is connected to said control means and which operates under the control of the said control means when the quality of the signal supplied by either one of the first and second radio relay receivers falls below a predetermined standard to set up paths for supplying to both the first and second radio relay transmitters a modulation signal obtained from the other radio relay receiver, said switching means comprising first and second paths, a first switch selectively to connect the first radio relay transmitter either to the first network or to one end of the first path for the purpose of supplying a modulation signal to that transmitter, a second switch to connect the other end of the first path to the shunt arm of the second network, a third switch selectively to connect the second radio relay transmitter either to the second network or to one end of the second path for the purpose of supplying a modulation signal to that transmitter, and a fourth switch to connect the other end of the second path to the shunt arm of the first network.

2. A radio communication system comprising a transmitting terminal station which has two radio transmitters and means to supply the same modulation simultaneously to both transmitters; a receiving terminal station which has two radio receivers which are linked by way of two signalling channels to the said two transmitters, an output path, and means to select and pass to the output path the qualitatively better one of the signals supplied by the two receivers; and a relay station which comprises a first radio relay receiver, a second radio relay receiver, a first radio relay transmitter, a second radio relay transmitter, a first attenuation network normally connected between the first radio relay receiver and the first radio relay transmitter to feed an output signal supplied by the first radio relay receiver as a modulation signal to the first radio relay transmitter, a second attenuation network normally connected between the second radio receiver and the second radio relay transmitter to feed an output signal supplied by the second radio relay receiver as a modulation signal to the second radio relay transmitter, the first radio relay receiver and the first radio relay transmitter forming part of one of said signalling channels, the second radio relay receiver and the second radio relay transmitter forming part of the other signalling channel, and each of the first and second networks being a T-network which has resistive series and shunt arms, control means which is connected to both the first and second radio relay receivers and which is responsive to the signals supplied by those receivers, and switching means which is connected to said control means and which operates under the control of the said control means when the quality of the signal supplied by either one of the first and second radio relay receivers falls below a predetermined standard to set up paths for supplying to both the first and second radio relay transmitters a modulation signal obtained from the other radio relay receiver, said switching means comprising a first path which is connected at one end of the shunt arm of the first network, a first switch selectively to connect the other end of the first path to the shunt arm of the second network, a second path connected at one end to the shunt arm of the second network, and a second switch selectively to connect the other end of the second path to the shunt arm of the first network.

3. A radio communication system according to claim 2 wherein each of the first and second paths contains an amplifier.

4. A radio communication system according to claim 2 wherein the switching means is operated by the control means in dependence upon the levels of the signals supplied by the first and second radio relay receivers.

5. A radio communication system according to claim 4 wherein the switching means operates in dependence upon the automatic gain control voltages of the first and second radio relay receivers.

6. A radio communication system according to claim 2 wherein there is means which is connected to said control means to prevent operation of the switching means as aforesaid when the quality of the signals supplied by both the first and second radio relay receivers falls below the predetermined standard.

7. Apparatus for a radio repeater station which is arranged to provide two separate channels through the station during normal operation, the two channels carrying the same modulation intelligence, comprising first and second radio receivers each having first and second output circuits, first and second radio transmitters, first and second utilization devices, a first attenuation network connected between the second output circuit of the first receiver and the first utilization device, a second attenuation network connected between the second output circuit of the second receiver and the second utilization device, each of the first and second attenuation neworks being a T-network with resistive series and shunt arms, a first switch selectively to set up a path for supplying a modulation signal to the first transmitter either from the first output circuit of the first receiver or from the shunt arm of the second network, a second switch selectively to set up a path for supplying a modulation signal to the second transmitter either from the second output circuit of the second receiver or from the shunt arm of the first network, the first and second switches being operated under normal conditions so that modulation signals for the first and second transmitters are supplied by the first and second receivers respectively, control means which operates the first switch in response to the quality of the signal supplied by the first receiver falling below a predetermined standard, and control means which operates the second switch in response to the quality of the signal supplied by the second receiver falling below said standard, whereby when the quality of the signal supplied by one of the first and second receivers falls below said standard, the transmitter which normally obtained its modulation signal from that receiver is supplied with a modulation signal by the other receiver.

References Cited in the file of this patent

UNITED STATES PATENTS

| | | |
|---|---|---|
| 2,487,513 | Beverage | Nov. 8, 1949 |
| 2,508,983 | Winchel | May 23, 1950 |
| 2,551,805 | McDonald | May 8, 1951 |
| 2,699,495 | Magnuski et al. | Jan. 11, 1955 |
| 2,733,296 | Maggio | Jan. 31, 1956 |
| 2,806,944 | Sheffield et al. | Sept. 17, 1957 |
| 2,864,943 | Schultz | Dec. 16, 1958 |
| 2,892,930 | Magnuski et al. | June 30, 1960 |